United States Patent
Rohrig et al.

(10) Patent No.: US 11,908,312 B2
(45) Date of Patent: Feb. 20, 2024

(54) MODULAR PROXIMITY SENSING IN ATMOSPHERIC SUIT

(71) Applicant: Hamilton Sundstrand Corporation, Charlotte, NC (US)

(72) Inventors: Jake Rohrig, Simsbury, CT (US); Ashley Rose Himmelmann, Beloit, WI (US); Monica Torralba, Antioch, CA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/540,811

(22) Filed: Dec. 2, 2021

(65) Prior Publication Data

US 2023/0177932 A1 Jun. 8, 2023

(51) Int. Cl.
| | |
|---|---|
| *G08B 7/06* | (2006.01) |
| *G01S 13/08* | (2006.01) |
| *G08B 21/18* | (2006.01) |

(52) U.S. Cl.
CPC ............... *G08B 7/06* (2013.01); *G01S 13/08* (2013.01); *G08B 21/182* (2013.01)

(58) Field of Classification Search
CPC .......... G08B 7/06; G08B 21/182; G08B 6/00; G08B 7/02; G08B 21/02; G08B 21/18; G08B 23/00; G01S 13/08
See application file for complete search history.

(56) References Cited

U.S. PATENT DOCUMENTS

| | | | |
|---|---|---|---|
| 9,072,941 B2 | 7/2015 | Duda et al. | |
| 10,499,693 B2 | 12/2019 | Chin et al. | |
| 2016/0171846 A1* | 6/2016 | Brav | G08B 6/00 340/407.1 |
| 2017/0360122 A1* | 12/2017 | Chin | F41H 5/0492 |
| 2018/0249087 A1* | 8/2018 | Arnold | H04N 23/698 |
| 2020/0326537 A1 | 10/2020 | Busey et al. | |
| 2021/0223557 A1* | 7/2021 | Lamm | G02B 27/0093 |
| 2021/0354858 A1 | 11/2021 | Rampone et al. | |

FOREIGN PATENT DOCUMENTS

WO   2015147625 A1   10/2015

OTHER PUBLICATIONS

European Search Report for European Application No. 22210945.6, dated Apr. 19, 2023, 103 pages.
Loflin, et al.; Identification of shoulder joint clearance in space suit using electromagnetic resonant spiral proximity sensor for injury prevention; ACTA Astronautica, Pergamon Press, Elmsford, GB, vol. 170, Jan. 10, 2020, pp. 46-54.

\* cited by examiner

*Primary Examiner* — Brian Wilson
(74) *Attorney, Agent, or Firm* — CANTOR COLBURN LLP

(57) ABSTRACT

A system for an atmospheric suit includes one or more modular proximity sensors affixed to corresponding one or more portions of the atmospheric suit. Each of the one or more proximity sensors provides a distance to a nearest object from the corresponding portion of the atmospheric suit. The system also includes processing circuitry to obtain the distance from each of the one or more proximity sensors to the nearest object and to provide information to the wearer of the atmospheric suit.

18 Claims, 3 Drawing Sheets

MODULAR PROXIMITY SENSING IN ATMOSPHERIC SUIT

BACKGROUND

Exemplary embodiments pertain to the art of atmospheric suits and, in particular, to modular proximity sensing in an atmospheric suit.

In some environments and applications, an atmospheric suit is used not only for protection against impacts but also to maintain a habitable environment. In a space application, an atmospheric suit referred to as an extravehicular mobility unit (EMU), for example, includes a helmet and full body suit supplied by an oxygen tank that are essential for maintaining an environment that sustains the astronaut. Rupture of or damage to the atmospheric suit resulting in pressure loss or exposure to the atmosphere can create a life-threatening situation for the astronaut.

BRIEF DESCRIPTION

In one exemplary embodiment, a system for an atmospheric suit includes one or more modular proximity sensors affixed to corresponding one or more portions of the atmospheric suit. Each of the one or more proximity sensors provides a distance to a nearest object from the corresponding portion of the atmospheric suit. The system also includes processing circuitry configured to obtain the distance from each of the one or more proximity sensors to the nearest object and to provide information to the wearer of the atmospheric suit.

In addition to one or more of the features described herein, each of the one or more proximity sensors obtains the distance to the nearest object periodically.

In addition to one or more of the features described herein, the processing circuitry provides the information based on the distance from one or more of the one or more proximity sensors being at or below a threshold distance.

In addition to one or more of the features described herein, the processing circuitry obtains the threshold distance as an input from a wearer of the atmospheric suit.

In addition to one or more of the features described herein, the processing circuitry provides the information as an audible alarm through one or more speakers in a helmet of the atmospheric suit.

In addition to one or more of the features described herein, the processing circuitry provides the information as a haptic output.

In addition to one or more of the features described herein, the processing circuitry provides the information as a visual alarm based on light emitting diodes co-located with the one or more of the one or more proximity sensors.

In addition to one or more of the features described herein, the processing circuitry provides the information as an alert on a display in a helmet of the atmospheric suit.

In addition to one or more of the features described herein, the processing circuitry obtains a request for a distance from one of the one or more proximity sensors as an input from a wearer of the atmospheric suit and to trigger the one or the one or more proximity sensors to obtain the distance based on the request.

In addition to one or more of the features described herein, the processing circuitry provides the distance from the one of the one or more proximity sensors as the information on a display or audibly via a speaker in a helmet of the atmospheric suit.

In another exemplary embodiment, a method of assembling a system for an atmospheric suit includes affixing one or more modular proximity sensors to corresponding one or more portions of the atmospheric suit. Each of the one or more proximity sensors provides a distance to a nearest object from the corresponding portion of the atmospheric suit. The method also includes configuring processing circuitry to obtain the distance from each of the one or more proximity sensors to the nearest object and to provide information to the wearer of the atmospheric suit.

In addition to one or more of the features described herein, the configuring the processing circuitry includes the processing circuitry obtaining the distance to the nearest object periodically.

In addition to one or more of the features described herein, the configuring the processing circuitry includes the processing circuitry providing the information based on the distance from one or more of the one or more proximity sensors being at or below a threshold distance.

In addition to one or more of the features described herein, the configuring the processing circuitry includes the processing circuitry obtaining the threshold distance as an input from a wearer of the atmospheric suit.

In addition to one or more of the features described herein, the configuring the processing circuitry includes the processing circuitry providing the information as an audible alarm through one or more speakers in a helmet of the atmospheric suit.

In addition to one or more of the features described herein, the configuring the processing circuitry includes the processing circuitry providing the information as a haptic output.

In addition to one or more of the features described herein, the configuring the processing circuitry includes the processing circuitry providing the information as a visual alarm based on light emitting diodes co-located with the one or more of the one or more proximity sensors.

In addition to one or more of the features described herein, the configuring the processing circuitry includes the processing circuitry providing the information as an alert on a display in a helmet of the atmospheric suit.

In addition to one or more of the features described herein, the configuring the processing circuitry includes the processing circuitry obtaining a request for a distance from one of the one or more proximity sensors as an input from a wearer of the atmospheric suit and to trigger the one or the one or more proximity sensors to obtain the distance based on the request.

In addition to one or more of the features described herein, the configuring the processing circuitry includes the processing circuitry providing the distance from the one of the one or more proximity sensors as the information on a display or audibly via a speaker in a helmet of the atmospheric suit.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, an atmospheric suit (e.g., space suit) creates a habitable environment for the wearer. Thus, the atmospheric suit facilitates exploration and operation in otherwise-inhospitable settings. As also noted, damage or rupture of the atmospheric suit can create a hazardous condition for the wearer. When a wearer (e.g., astronaut in a space suit) cannot see potential hazards because of low visibility or a particular maneuver (e.g., backing up), the potential for damage to the atmospheric suit by impacting a hard surface is increased.

Embodiments of the systems and methods detailed herein relate to modular proximity sensing in an atmospheric suit. One or more proximity sensors are attached to parts of the atmospheric suit to determine a distance from those parts to a surface. Modularity refers to the fact that the proximity sensors may be moved to different parts of the atmospheric suit based on a particular anticipated scenario, for example. For ease of discussion, the atmospheric suit refers to not only the helmet and full body suit but also to the life support system and communication system attached thereto.

Thus, in the exemplary space application, the EMU along with a primary life support system (PLSS) and a display and control module (DCM) are referred to as an atmospheric suit. While an EMU and a space application are specifically discussed for explanatory purposes, applications for the proximity sensing according to one or more embodiments also include underwater (e.g., in an atmospheric diving suit), earth-based (e.g., in a hazmat suit or contamination suit), high-altitude (e.g., in a flight suit), and sub-surface environments. Generally, any suit that includes the helmet to maintain a habitable environment and attachments to provide life support and communication is referred to as an atmospheric suit.

Figure 1:
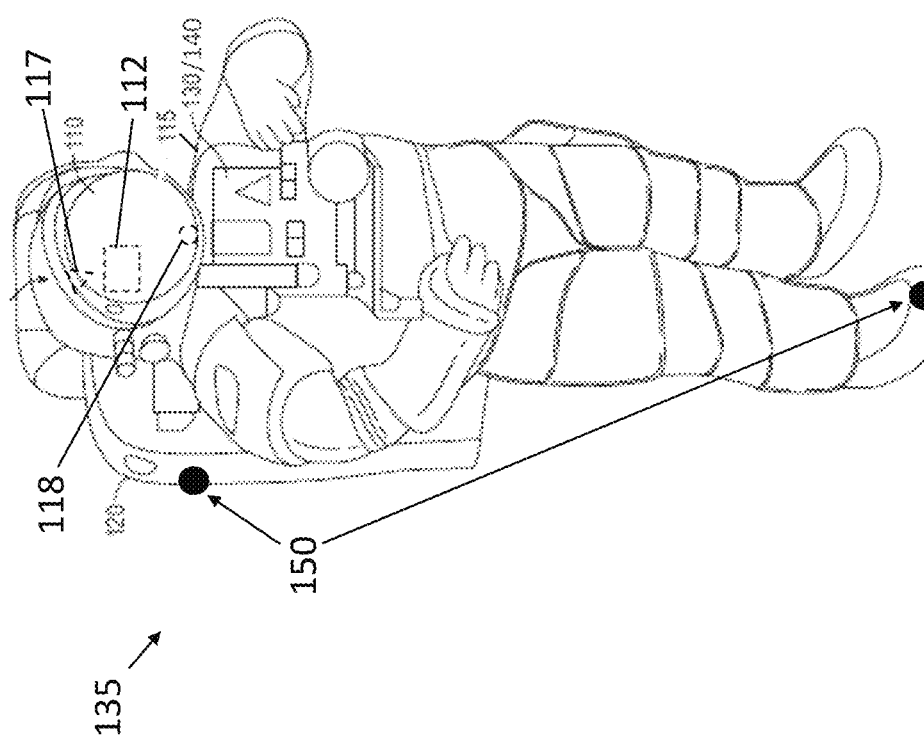
FIG. 1 shows an atmospheric suit with a proximity sensing system according to one or more embodiments.

FIG. 1 shows an atmospheric suit 100 with a proximity sensing system 135 according to one or more embodiments. The exemplary atmospheric suit 100 shown in FIG. 1 is an EMU 105 that includes a helmet 110, full-body suit 115 that includes boots, PLSS 120, and DCM 130. A display 112 and a speaker 117 are indicated within the helmet 110. These are further discussed with reference to FIG. 2. The processing circuitry 140 of the proximity sensing system 135 may be part of our coupled to the existing components of the DCM 130. The processing circuitry 140, separately or through the DCM 130, may include one or more processors and memory. The proximity sensing system 135 also includes one or more proximity sensors 150 that are modular (i.e., repositionable) and communicate with the processing circuitry 140. Each proximity sensor 150 may be affixed to a portion of the atmospheric suit 100 and may be positioned to obtain the distance from that portion to a closest object 210 to the portion.

The proximity sensors 150 may be known devises that provide a distance to the closest object 210 (FIG. 2), and different proximity sensors 150 may be of different types. An exemplary proximity sensor 150 is an optical proximity sensor (e.g., lidar system) that transmits incident light and detects a reflection of the incident light from an object 210. Another exemplary proximity sensor 150 is a capacitive proximity sensor that detects distance to the closest object 210 based on a change in its capacitance due to the object 210. Yet other exemplary proximity sensors 150 include a magnetic proximity sensor that detects a magnetic field of a magnetic object 210 and an ultrasonic proximity sensor that emits an ultrasonic pulse (i.e., sound wave) and detects the reflection of that emitted pulse. Different proximity sensors 150 may be employed based on the environment (e.g., ultrasonic proximity sensor may be impractical in the vacuum of space).

Figure 2:
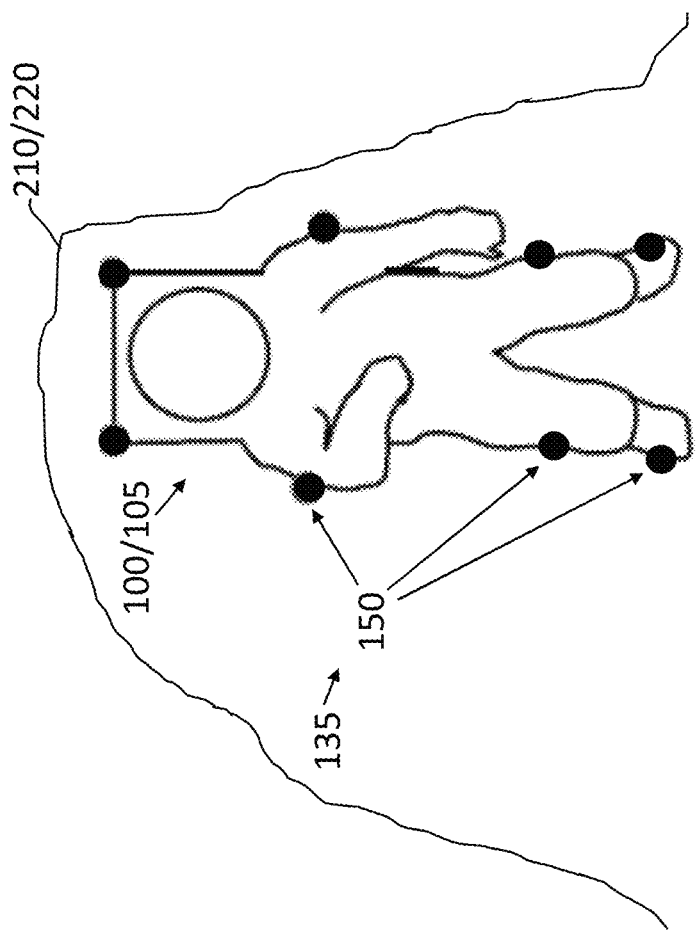
FIG. 2 illustrates an exemplary scenario for the atmospheric suit with the proximity sensing system according to one or more embodiments.

FIG. 2 illustrates an exemplary scenario for the atmospheric suit 100 with the proximity sensing system 135 according to one or more embodiments. The wearer of the atmospheric suit 100 (e.g., an EMU 105) is exploring a cave, as indicated. Thus, the cave wall 220 is the object 210 that is nearest to the proximity sensors 150 that are distributed at different portions of the atmospheric suit 100. In other scenarios, the portions of the atmospheric suit 100 to which the modular proximity sensors 150 are affixed may be changed. As FIG. 2 illustrates, the left side of the atmospheric suit 100 is closer to the wall 220 than the right. If the wearer of the atmospheric suit 100 has low visibility and cannot ascertain the distance to the walls 220 on each side, the proximity sensors 150 may be used to determine that the wearer should move to the right rather than farther to the left. As detailed, one or more types of information may be provided in one or more ways based on the proximity sensors 150 and the processing circuitry 140. The processing circuitry 140 is aware of the portion of the atmospheric suit 100 to which each proximity sensor 150 is affixed. The processing circuitry 140 may provide input to the display 112 and the speaker 117 and may obtain user inputs via the microphone 118 or DCM 130, for example. The processing circuitry 140 may additionally obtain information via gestures or any other known input mechanism.

The input from the wearer may indicate a request for the distance obtained by a particular proximity sensor 150 corresponding with a particular portion of the atmospheric suit 100, for example. This inquiry may trigger the particular proximity sensor 150, via the processing circuitry, to obtain a distance measurement. According to an exemplary embodiment, the processing circuitry 140 may map each proximity sensor 150 to the corresponding portion of the atmospheric suit. Thus, a wearer inquiry about the distance from the left shoulder to a wall 220 may be mapped by the processing circuitry 140 to the particular proximity sensor 150 that is affixed to the left shoulder of the atmospheric suit. In this case, the information provided by the processing circuitry may be a distance value. As another example, the input from the wearer may indicate a threshold distance. In this case, each proximity sensor 150 may obtain the distance to the closest object 210 periodically and the information provided by the processing circuitry 140 may be an alert when any proximity sensor 150 obtains a distance below the threshold distance.

As previously noted, information may be provided by the processing circuitry 140 in one or more ways. An alert or distance may be displayed on the display 112 or audibly indicated via the speaker 117. The exemplary illustration of one speaker 117 is not intended to preclude alternate or additional arrangements. For example, an array of speakers 117 may be used to provide directional audio output (e.g., alarm from the speaker in the direction corresponding to the proximity sensor 150 that obtained a distance to the object 210 that is below the threshold distance). Additional ways of providing information or alerts are discussed with reference to FIGS. 3 and 4.

Figure 3:
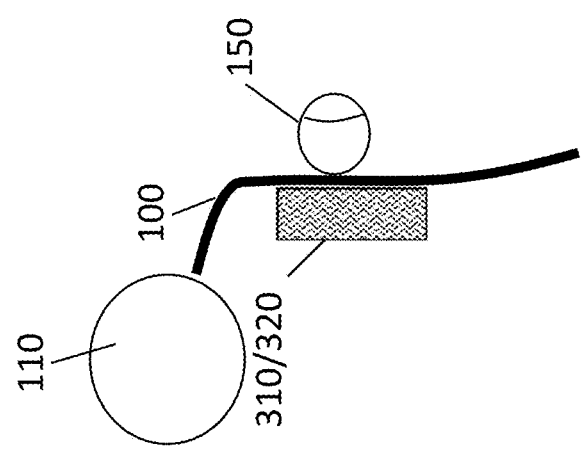
FIG. 3 shows a portion of the atmospheric suit with a proximity sensor according to an exemplary embodiment.

FIG. 3 shows a portion of the atmospheric suit 100 with a proximity sensor 150 according to an exemplary embodiment. A feedback device 310 is shown corresponding with the proximity sensor 150. As shown, the proximity sensor 150 may be on an outer surface of the atmospheric suit 100 while the feedback device 310 is on an inner surface of the atmospheric suit 100. The feedback device 310 may be adhered within the atmospheric suit 100 (e.g., adhered to the wearer prior to donning the atmospheric suit 100) according to alternate embodiments. The exemplary feedback device 310 in FIG. 3 may be a piezo haptic device 320. When the closest object 210 to the proximity sensor 150 is less than a threshold distance that is predefined or set based on input from the wearer, the haptic device 330 may vibrate to indicate to the wearer that the corresponding portion of the atmospheric suit 100 is too close to an object 210. The haptic device 320 may be actuated by the processing circuitry 140 that obtains the distance from the proximity sensor 150. The processing circuitry 140 may control a pattern of the haptic output. For example, the vibration frequency may increase as the distance decreases below the threshold distance.

Figure 4:
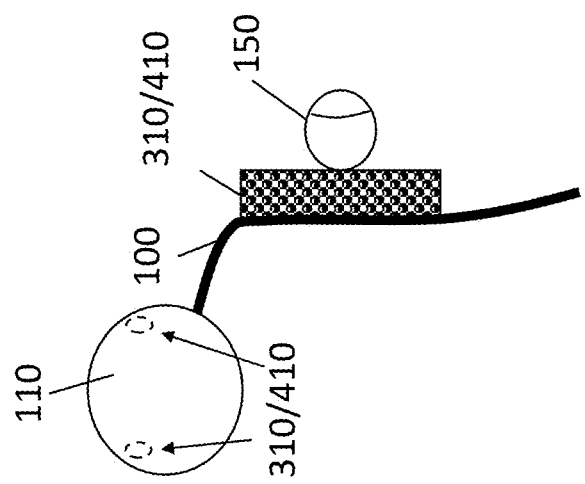
FIG. 4 shows a portion of the atmospheric suit with a proximity sensor according to another exemplary embodiment.

FIG. 4 shows a portion of the atmospheric suit 100 with a proximity sensor 150 according to an exemplary embodiment. The exemplary feedback device 310 may be one or an array of light emitting diodes (LEDs) 410. As shown, LEDs 410 may be arranged in the helmet 110 and the position of each LED 410 may correspond with an associated proximity sensor 150. For example, a proximity sensor 150 on the left shoulder of the atmospheric suit 100 may correspond with an LED 410 on the left side of the helmet 110. Alternately, the array of LED 410 may be co-located with the proximity sensor 150 on the outer surface of the atmospheric suit 100, as shown. The processing circuitry 140 may map each proximity sensor 150 to a particular one or array of LEDs 410 and may actuate the LED 410 based on the distance detected by the proximity sensor 150. The color indicated by the array of LEDs 410 may be controlled by the processing circuitry 140 based on distance (e.g., yellow when the distance is 6 inches from the threshold distance, red when the distance is at or below the threshold distance). The LED 410 on the outer surface of the atmospheric suit 100 may be used when multiple astronauts are navigating a space together.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for an atmospheric suit, the system comprising:
    one or more modular proximity sensors affixed to corresponding one or more portions of the atmospheric suit, wherein each of the one or more proximity sensors is configured to provide a distance to a nearest object from the corresponding portion of the atmospheric suit; and
    processing circuitry configured to obtain the distance from each of the one or more proximity sensors to the nearest object and to provide information to a wearer of the atmospheric suit regarding the distance to the nearest object detected by the one or more proximity sensors;
    wherein the processing circuitry is configured to provide the information as a haptic output via a feedback device on an inner surface of the atmospheric suit;
    wherein a location of the feedback device on the inner surface corresponds to a location of a proximity sensor of the one or more proximity sensors on an outer surface of the atmospheric suit.

2. The system according to claim 1, wherein each of the one or more proximity sensors is configured to obtain the distance to the nearest object periodically.

3. The system according to claim 2, wherein the processing circuitry is configured to provide the information based on the distance from one or more of the one or more proximity sensors being at or below a threshold distance.

4. The system according to claim 3, wherein the processing circuitry is configured to obtain the threshold distance as an input from the wearer of the atmospheric suit.

5. The system according to claim 3, wherein the processing circuitry is configured to provide the information as an audible alarm through one or more speakers in a helmet of the atmospheric suit.

6. The system according to claim 3, wherein the processing circuitry is configured to provide the information as a visual alarm based on light emitting diodes co-located with the one or more of the one or more proximity sensors.

7. The system according to claim 3, wherein the processing circuitry is configured to provide the information as an alert on a display in a helmet of the atmospheric suit.

8. The system according to claim 1, wherein the processing circuitry is configured to obtain a request for a distance from one of the one or more proximity sensors as an input from the wearer of the atmospheric suit and to trigger the one of the one or more proximity sensors to obtain the distance based on the request.

9. The system according to claim 8, wherein the processing circuitry is configured to provide the distance from the one of the one or more proximity sensors as the information on a display or audibly via a speaker in a helmet of the atmospheric suit.

10. A method of assembling a system for an atmospheric suit, the method comprising:

affixing one or more modular proximity sensors to corresponding one or more portions of the atmospheric suit, wherein each of the one or more proximity sensors is configured to provide a distance to a nearest object from the corresponding portion of the atmospheric suit; and configuring processing circuitry to obtain the distance from each of the one or more proximity sensors to the nearest object and to provide information to a wearer of the atmospheric suit regarding the distance to the nearest object detected by the one or more proximity sensors; and providing the information as a haptic output via a feedback device on an inner surface of the atmospheric suit;

wherein a location of the feedback device on the inner surface corresponds to a position of a proximity sensor of the one or more proximity sensors on an outer surface of the atmospheric suit.

11. The method according to claim 10, wherein the configuring the processing circuitry includes the processing circuitry obtaining the distance to the nearest object periodically.

12. The method according to claim 11, wherein the configuring the processing circuitry includes the processing circuitry providing the information based on the distance from one or more of the one or more proximity sensors being at or below a threshold distance.

13. The method according to claim 12, wherein the configuring the processing circuitry includes the processing circuitry obtaining the threshold distance as an input from the wearer of the atmospheric suit.

14. The method according to claim 12, wherein the configuring the processing circuitry includes the processing circuitry providing the information as an audible alarm through one or more speakers in a helmet of the atmospheric suit.

15. The method according to claim 12, wherein the configuring the processing circuitry includes the processing circuitry providing the information as a visual alarm based on light emitting diodes co-located with the one or more of the one or more proximity sensors.

16. The method according to claim 12, wherein the configuring the processing circuitry includes the processing circuitry providing the information as an alert on a display in a helmet of the atmospheric suit.

17. The method according to claim 10, wherein the configuring the processing circuitry includes the processing circuitry obtaining a request for a distance from one of the one or more proximity sensors as an input from the wearer of the atmospheric suit and to trigger the one of the one or more proximity sensors to obtain the distance based on the request.

18. The method according to claim 17, wherein the configuring the processing circuitry includes the processing circuitry providing the distance from the one of the one or more proximity sensors as the information on a display or audibly via a speaker in a helmet of the atmospheric suit.

* * * * *